(12) United States Patent
Kim et al.

(10) Patent No.: US 11,711,332 B2
(45) Date of Patent: Jul. 25, 2023

(54) SYSTEM AND METHOD FOR CONVERSATION-BASED NOTIFICATION MANAGEMENT

(71) Applicant: Samsung Electronics Co., Ltd., Suwon-si (KR)

(72) Inventors: Jaehyun Kim, San Francisco, CA (US); Andrew R McHugh, Fremont, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/653,809

(22) Filed: Mar. 7, 2022

(65) Prior Publication Data
US 2022/0385617 A1 Dec. 1, 2022

Related U.S. Application Data

(60) Provisional application No. 63/193,020, filed on May 25, 2021.

(51) Int. Cl.
*G06F 15/16* (2006.01)
*H04L 51/224* (2022.01)
(Continued)

(52) U.S. Cl.
CPC ............ *H04L 51/224* (2022.05); *G01S 13/46* (2013.01); *G02B 27/0101* (2013.01);
(Continued)

(58) Field of Classification Search
CPC . H04L 51/224; H04L 51/046; G02B 27/0101; G02B 27/0172; G02B 2027/0138; G02B 2027/0178
(Continued)

(56) References Cited

U.S. PATENT DOCUMENTS 8,836,641 B1 9/2014 Kim et al.
8,947,323 B1 2/2015 Raffle et al.
(Continued)

FOREIGN PATENT DOCUMENTS

GB 2530644 A 3/2016
JP 2015149654 A 8/2015
KR 20160016540 A 2/2016

OTHER PUBLICATIONS

International Search Report and Written Opinion of the International Searching Authority dated Aug. 23, 2022 in connection with International Patent Application No. PCT/KR2022/007386, 9 pages.

*Primary Examiner* — Moustafa M Meky

(57) ABSTRACT

A method for dynamic notification management at a head mounted display (HMD) includes presenting, at the HMD, an augmented reality display, receiving, at a processor controlling the HMD, a notification from an application for display at the HMD, receiving, at the processor at a first time, first sensor data from one or more of a camera or a microphone, determining, based on the first sensor data, a first value of one or more factors associated with a probability that a user of the HMD is currently in a real-world conversation, determining an importance value of the received notification at the first time, and determining whether to display the notification from the application based on a comparison of the first value of the one or more factors associated relative to the importance value of the received notification.

20 Claims, 8 Drawing Sheets

(51) Int. Cl.
  *H04L 51/046* (2022.01)
  *G02B 27/01* (2006.01)
  *G01S 13/46* (2006.01)
  *G06V 40/16* (2022.01)
  *G06F 16/51* (2019.01)
  *G06T 19/00* (2011.01)
  *G10L 17/00* (2013.01)

(52) U.S. Cl.
  CPC ......... *G02B 27/0172* (2013.01); *G06F 16/51* (2019.01); *G06T 19/006* (2013.01); *G06V 40/172* (2022.01); *G10L 17/00* (2013.01); *H04L 51/046* (2013.01); *G01S 2013/468* (2013.01); *G02B 2027/0138* (2013.01); *G02B 2027/0178* (2013.01)

(58) Field of Classification Search
  USPC ......................................................... 709/207
  See application file for complete search history.

(56) References Cited

U.S. PATENT DOCUMENTS

| | | | |
|---|---|---|---|
| 9,304,585 B2 * | 4/2016 | Fujii | .................... G02B 27/017 |
| 10,037,084 B2 | 7/2018 | Joo | |
| 10,134,358 B2 | 11/2018 | Jung et al. | |
| 10,444,930 B2 | 10/2019 | Kim et al. | |
| 10,447,966 B2 * | 10/2019 | Ritchey | ............... G02B 27/0176 |
| 10,474,411 B2 | 11/2019 | Rochford et al. | |
| 10,499,179 B1 * | 12/2019 | Lyren | ...................... H04S 7/302 |
| 10,656,731 B2 * | 5/2020 | Garcia | .................. G06F 3/0482 |
| 10,663,729 B2 * | 5/2020 | Kazansky | ............ G06F 3/04815 |
| 10,705,605 B2 * | 7/2020 | Ikuta | .................. G02B 27/0172 |
| 10,798,510 B2 * | 10/2020 | Lyren | ...................... H04L 51/10 |
| 10,838,205 B2 | 11/2020 | Fujimaki et al. | |
| 10,848,893 B2 * | 11/2020 | Lyren | .................... G06T 13/205 |
| 10,921,605 B2 | 2/2021 | Reyes et al. | |
| 10,956,840 B2 | 3/2021 | Sudo et al. | |
| 11,002,965 B2 * | 5/2021 | Abdollahian | ........ G06V 40/161 |
| 11,086,587 B2 * | 8/2021 | Miyazaki | ................ G06F 3/011 |
| 11,323,836 B2 * | 5/2022 | Lyren | ...................... H04S 1/002 |
| 11,323,837 B2 * | 5/2022 | Lyren | ...................... H04S 7/302 |
| 11,450,071 B2 * | 9/2022 | Stokking | .................. G06T 7/50 |
| 2014/0253588 A1 | 9/2014 | Mandala | |
| 2016/0034042 A1 | 2/2016 | Joo | |
| 2016/0054795 A1 | 2/2016 | Sasaki | |
| 2017/0123747 A1 | 5/2017 | Rochford et al. | |
| 2017/0337897 A1 | 11/2017 | Jung et al. | |
| 2018/0219824 A1 | 8/2018 | Laller | |
| 2018/0262362 A1 | 9/2018 | Goldstein et al. | |
| 2019/0146753 A1 | 5/2019 | Parkinson et al. | |
| 2020/0356180 A1 | 11/2020 | Joo | |

\* cited by examiner

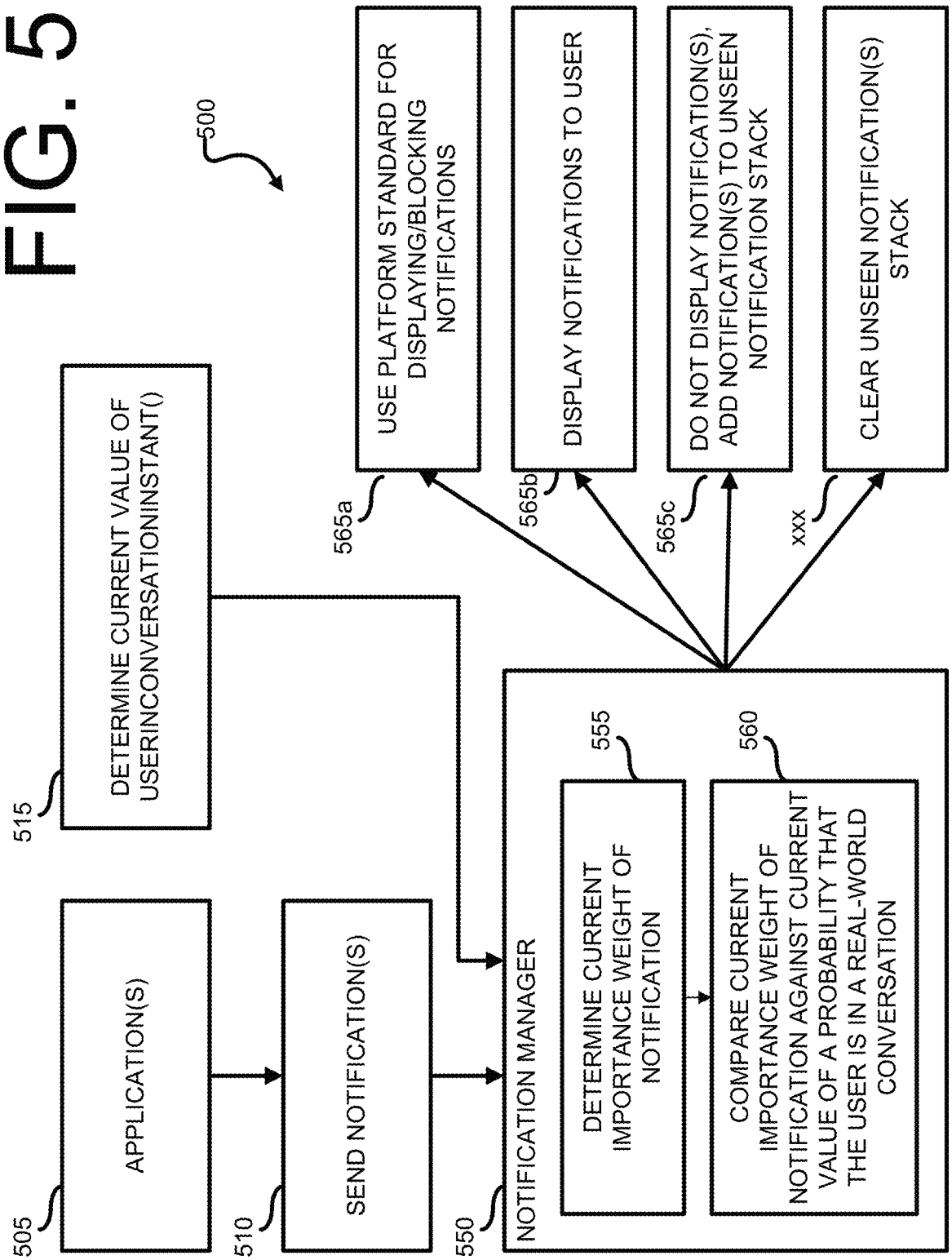

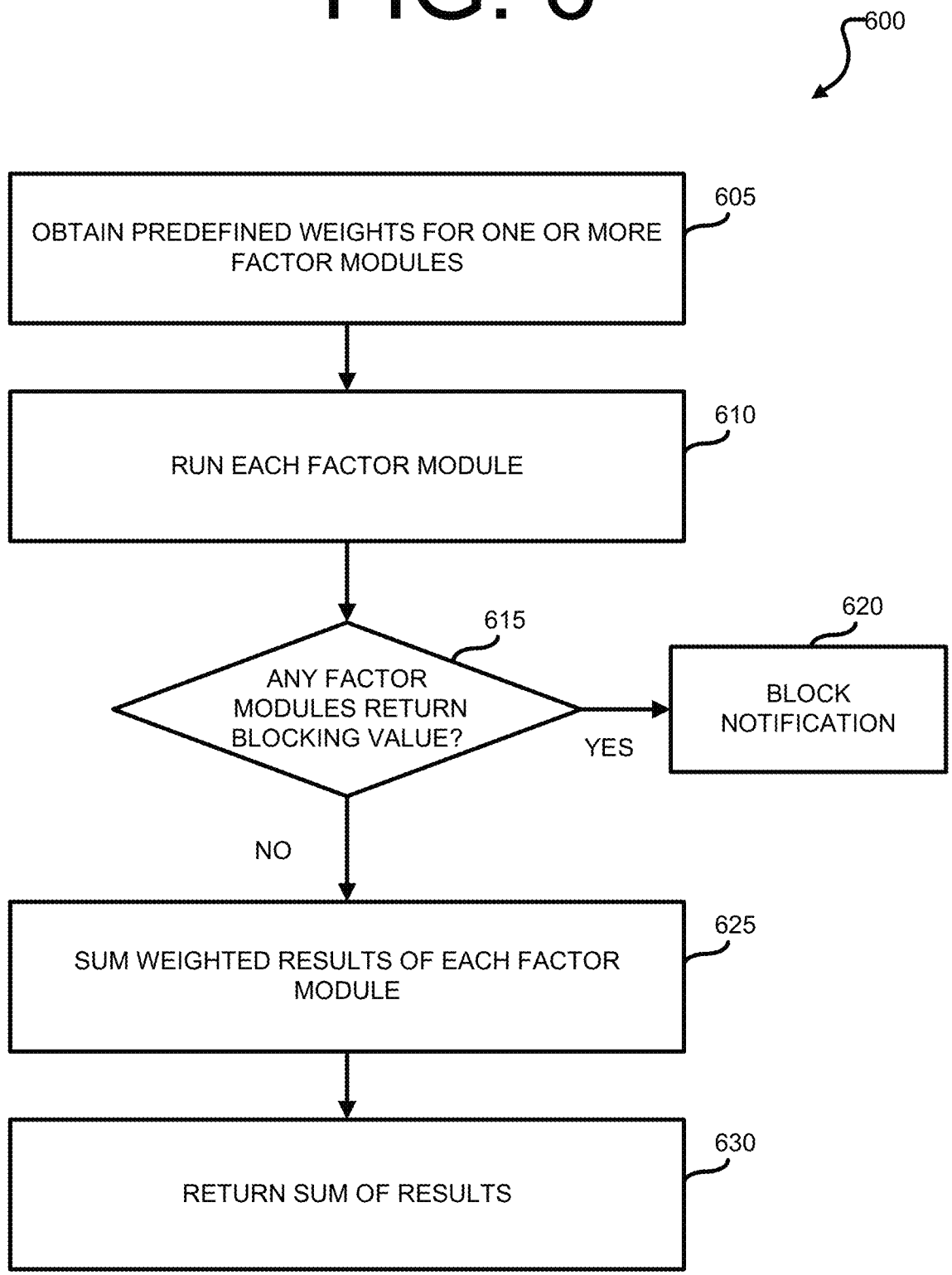

SYSTEM AND METHOD FOR CONVERSATION-BASED NOTIFICATION MANAGEMENT

CROSS-REFERENCE TO RELATED APPLICATION AND CLAIM OF PRIORITY

This application claims priority under 35 U.S.C. § 119(e) to U.S. Provisional Patent Application No. 63/193,020 filed on May 25, 2021. The above-identified provisional patent application is hereby incorporated by reference in its entirety.

TECHNICAL FIELD

This disclosure relates generally to augmented reality (AR) and systems and methods for managing AR displays. More specifically, this disclosure relates to a system and method for conversation-based notification management.

BACKGROUND

Portable networked devices with displays, such as tablets and smartphones have, within the course of little over a decade, gone from being luxury items to supplanting desktop computers, fax machines and landline telephones as the default device for personal and business communications. The smartphone's dominance as the primary communication interface for millions of people is reflected by the frequency with which many users check their devices and the steady rise in screen time among users.

In addition to the emergence of portable networked devices as a dominant communication medium, the past decade has also witnessed the emergence of new display technologies, including virtual reality (VR) and augmented reality (AR), which harness the possibilities of small form processors and lightweight displays to provide displays which supplant or augment the feed of visual information to viewers' eyes from the physical world. Typically, AR displays are provided through head-mounted apparatus, such as AR glasses or other head-mounted displays ("HMD")

Similar to hand-held or worn devices, such as smartphones and smart watches, notifications, such as pop-up messages, from applications can be provided to a user as part of an AR display presented through an HMD. However, unlike a smartphone, where a user has one or more mechanical options (for example, putting her phone in her pocket or purse) by which she can postpone seeing a notification provided through the device, the fact that the HMD is worn in front of the user's eyes, means that HMD users have less agency to defer reviewing notifications from applications than users of other apparatus. The immersive character of the AR experience means that AR HMD users must rely primarily on the control logic providing the AR display to perform an analysis of the operating context of the HMD and present notifications in a way that is contextually appropriate.

Analyzing the operational context of an HMD and determining appropriate times to present notifications through an AR display presents a nuanced, multi-faceted problem that resists simple rule-based solutions. For example, a simple rule suspending presenting notifications through the HMD whenever the outside sound level exceeds a threshold amplitude, while perhaps effective for ensuring that notifications do not interrupt a user's real-world conversations, would almost certainly be over-exclusive, and prevent the display of important or urgent notifications.

Accordingly, providing effective, context-aware notification management at AR devices, particularly where human voices have been detected, remains a source of technical challenges and opportunities for improvement in the art.

SUMMARY

This disclosure provides a system and method for conversation-based notification management.

In a first embodiment, a method for dynamic notification management at an HMD includes presenting, at the HMD, an augmented reality (AR) display comprising items of digital content incorporated into a field of view of the HMD, receiving, at a processor controlling the HMD, a notification from an application for display at the HMD, receiving, at the processor at a first time, first sensor data from one or more of a camera or a microphone, the one or more of the camera or the microphone being located proximate to the HMD, determining, based on the first sensor data, a first value of one or more factors associated with a probability that a user of the HMD is currently in a real-world conversation, determining an importance value of the received notification at the first time, and determining whether to display the notification from the application based on a comparison of the first value of the one or more factors associated with the probability that the user is currently in the real-world conversation relative to the importance value of the received notification at the first time.

In a second embodiment, an apparatus for performing for dynamic notification management includes a processor communicatively connected to a head mounted display and a memory. The memory contains instructions, which when executed by the processor, cause the apparatus to present, at an HMD, an AR display comprising items of digital content incorporated into a field of view of the HMD, receive, a notification from an application for display at the HMD, receive, at a first time, first sensor data from one or more of a camera or a microphone, the one or more of the camera or the microphone being located proximate to the HMD, determine, based on the first sensor data, a first value of one or more factors associated with a probability that a user of the HMD is currently in a real-world conversation, determine an importance value of the received notification at the first time, and determine whether to display the notification from the application based on a comparison of the first value of the one or more factors associated with the probability that the user is currently in the real-world conversation relative to the importance value of the received notification at the first time.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory, random access memory, a hard disk drive, a compact disc, a digital video disc, or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIG. 5 illustrates an example architecture for performing conversation-based notification management according to certain embodiments of this disclosure;

FIG. 6 illustrates a process for determining an instant value of a variable embodying an instant probability that a user is in a real-world conversation according to certain embodiments of this disclosure;

DETAILED DESCRIPTION

FIGS. 1 through 8, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged wireless communication system.

Figure 1:
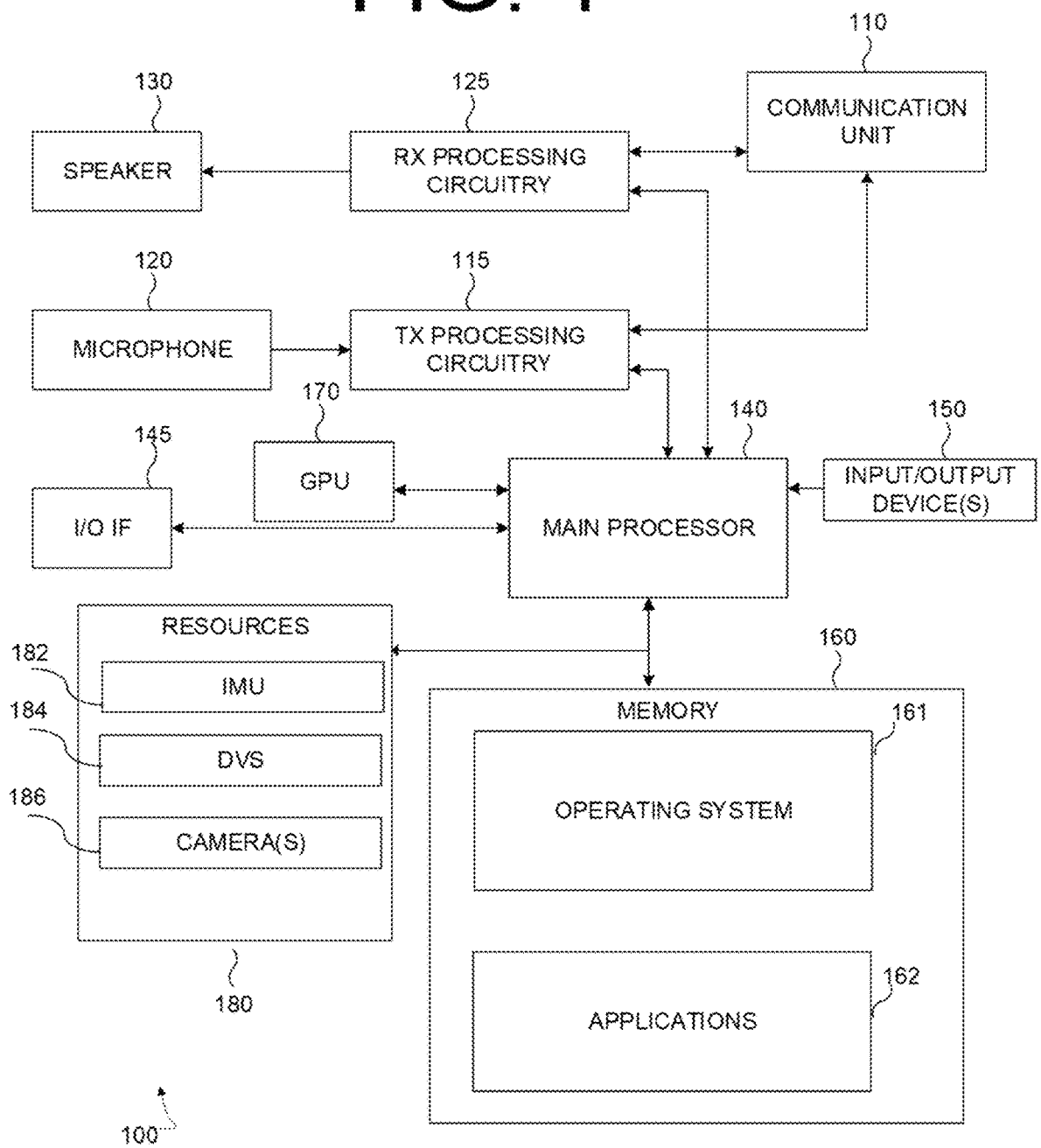
FIG. 1 illustrates an example of an electronic device for implementing systems and methods for augmented reality according to certain embodiments of this disclosure.

FIG. 1 illustrates a non-limiting example of a device 100 for providing conversation-based notification management at an HMD according to some embodiments of this disclosure. The embodiment of the device 100 shown in FIG. 1 is for illustration only, and other configurations are possible. However, suitable devices come in a wide variety of configurations, and FIG. 1 does not limit the scope of this disclosure to any particular implementation of a device. For example, device 100 may be implemented as an HMD, or as a separate device (for example, a smartphone) controlling an AR display presented at a connected (for example, through a BLUETOOTH or ZIGBEE connection) HMD. Depending on the form factor, battery life, and other performance requirements of the system providing the AR display, other embodiments are possible and within the contemplated scope of this disclosure.

As shown in the non-limiting example of FIG. 1, the device 100 includes a communication unit 110 that may include, for example, a radio frequency (RF) transceiver, a BLUETOOTH transceiver, or a WI-FI transceiver, etc., transmit (TX) processing circuitry 115, a microphone 120, and receive (RX) processing circuitry 125. The device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include games, social media applications, applications for geotagging photographs and other items of digital content, virtual reality (VR) applications, augmented reality (AR) applications, operating systems, device security (e.g., anti-theft and device tracking) applications or any other applications which access resources of device 100, the resources of device 100 including, without limitation, speaker 130, microphone 120, input/output devices 150, and additional resources 180. According to some embodiments, applications 162 include applications which can consume image data from physical objects in a field of view of a camera of electronic device 100 and provide AR or VR content through a display of device 100, or a display of a separate device. Further, one or more of applications 162 are configured to periodically provide a user with application-related notifications through an HMD connected to device 100.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of device 100, or legacy applications developed for earlier platforms. Additionally, main processor 140 can be manufactured to include program logic for implementing methods for monitoring suspicious application access according to certain embodiments of the present disclosure. The main processor 140 is also coupled to the I/O interface 145, which provides the device 100 with the ability to connect to other devices such as laptop computers and handheld computers. The I/O interface 145 is the communication path between these accessories and the main processor 140.

The main processor 140 is also coupled to the input/output device(s) 150. The operator of the device 100 can use the input/output device(s) 150 to enter data into the device 100. Input/output device(s) 150 can include keyboards, head mounted displays (HMD), touch screens, mouse(s), track balls or other devices capable of acting as a user interface to allow a user to interact with electronic device 100. In some embodiments, input/output device(s) 150 can include a touch panel, a (digital) pen sensor, a key, or an ultrasonic input device.

Input/output device(s) 150 can include one or more screens, which can be a liquid crystal display, light-emitting diode (LED) display, an optical LED (OLED), an active-matrix OLED (AMOLED), or other screens capable of rendering graphics.

The memory 160 is coupled to the main processor 140. According to certain embodiments, part of the memory 160 includes a random access memory (RAM), and another part of the memory 160 includes a Flash memory or other read-only memory (ROM). Although FIG. 1 illustrates one example of a device 100. Various changes can be made to FIG. 1.

For example, according to certain embodiments, device 100 can further include a separate graphics processing unit (GPU) 170.

According to certain embodiments, electronic device 100 includes a variety of additional resources 180 which can, if permitted, be accessed by applications 162. According to certain embodiments, additional resources 180 include an accelerometer or inertial motion unit 182, which can detect movements of the electronic device along one or more degrees of freedom. Additional resources 180 include, in some embodiments, a dynamic vision sensor (DVS) 184, one or more cameras 186 of electronic device 100.

Although FIG. 1 illustrates one example of a device 100 for managing notifications provided through an AR display, various changes may be made to FIG. 1. For example, the device 100 could include any number of components in any suitable arrangement. In general, devices including computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
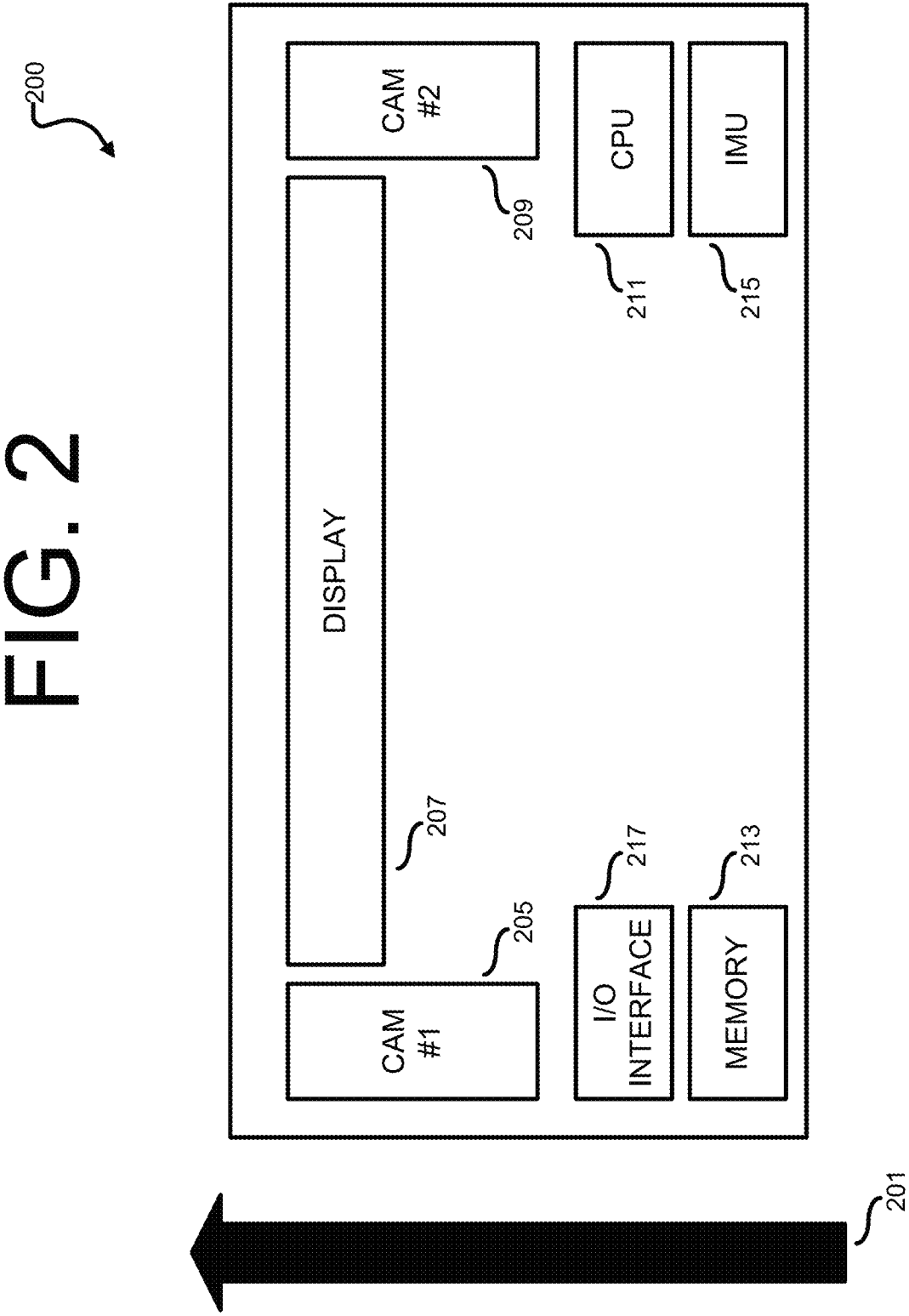
FIG. 2 illustrates an example of a head mounted display according to certain embodiments of this disclosure.

FIG. 2 illustrates an example of an HMD 200 according to one or more embodiments of this disclosure. According to some embodiments, HMD 200 may operate as an accessory device to another device (for example, a smartphone.

Referring to the non-limiting example of FIG. 2, HMD 200 includes an externally oriented camera 205. For the purposes of explaining this non-limiting example, the arrow 201 is provided. Arrow 201 points externally, towards a field of view away from the direction of projection of an internal-facing display of HMD 200. According to various embodiments, externally oriented camera 205 is an RGB digital video camera (for example, a camera using a CMOS sensor). According to some embodiments, externally oriented camera 205 is a camera capable of detecting light at wavelengths outside the visible range of the human eye (for example, infrared). In certain embodiments, externally oriented camera 205 is a dynamic vision sensor (DVS), which provides an event stream of changes in the intensity of light received at pixels of a sensor of the DVS. In this non-limiting example, externally oriented camera 205 generates image data, either as an event stream or as discrete image frames, from which objects in a field of view of HMD 200 may be recognized.

Referring to the non-limiting example of FIG. 2, HMD 200 includes display 207. According to various embodiments, display 207 displays, in an internally facing direction (e.g., in a direction having a component that is opposite to arrow 201) items of AR content in conjunction with views of objects in an externally facing field of view. According to some embodiments, the display 207 is clear (similar to, for example, the displays used in "smart glasses" or "heads-up displays" on the cockpit glass of an airplane) and views of objects in externally facing fields of view come from light passing through display 207. According to various embodiments, (sometimes referred to as "mixed reality") the display 207 is opaque, and views of objects in the externally facing fields of view come from image data from the externally oriented cameras (for example, the externally oriented camera 205).

According to various embodiments, the HMD 200 includes second camera 209. In some embodiments, the second camera 209 is an externally oriented camera of the same type as the externally oriented camera 205, thereby forming a stereoscopic pair that can generate image data comprising depth estimation. In certain embodiments, the second camera 209 is an externally oriented camera having a different sensor type than the externally oriented camera 205. For example, in some embodiments, to extend battery life and minimize processor usage, the externally oriented camera 205 is a DVS sensor, and the second camera 209 is a CMOS type camera, which, while less efficient than a DVS sensor, can provide additional image data that is useful for object recognition. For example, the data can be data regarding colors and elements of a scene whose brightness may not change at a level detectable by a DVS sensor. According to various embodiments, the second camera 209 is an internally facing camera that tracks the motion of the eyes of a user, and by implication, a direction of a gaze of the user. Gaze tracking can be used to support foveal rendering of items of AR content, which can conserve battery and processor resources by rendering items of AR content away from a viewer's gaze at lower resolutions.

According to certain embodiments, the HMD 200 includes processor 211 and memory 213. In certain embodiments, the memory 213 contains program code that, when executed by processor 211, causes the HMD 200 to execute an AR application.

Referring to the non-limiting example of FIG. 2, the HMD 200 includes an inertial measurement unit 215 that generates location data associated with the motion of HMD 200 along one or more degrees of freedom. In certain embodiments, a data output from IMU 215 is usable for positioning (for example, to confirm a geospatial position of HMD 200), or to obtain image stabilization data (for example, data indicating the direction and periodicity of a camera shake) to facilitate object recognition.

In some embodiments, the HMD 200 includes input/output interface 217. According to various embodiments, the I/O interface 217 provides communicative connectivity between the HMD 200 and at least one other electronic device, such as a smartphone, or computer to which the HMD 200 is an accessory device. The I/O interface 217 is, in certain embodiments, a wireless communication interface, such as a BLUETOOTH transceiver, or communication hardware supporting communications over one or more longer range wireless systems (for example, communication unit 110 in FIG. 1).

Figure 3:
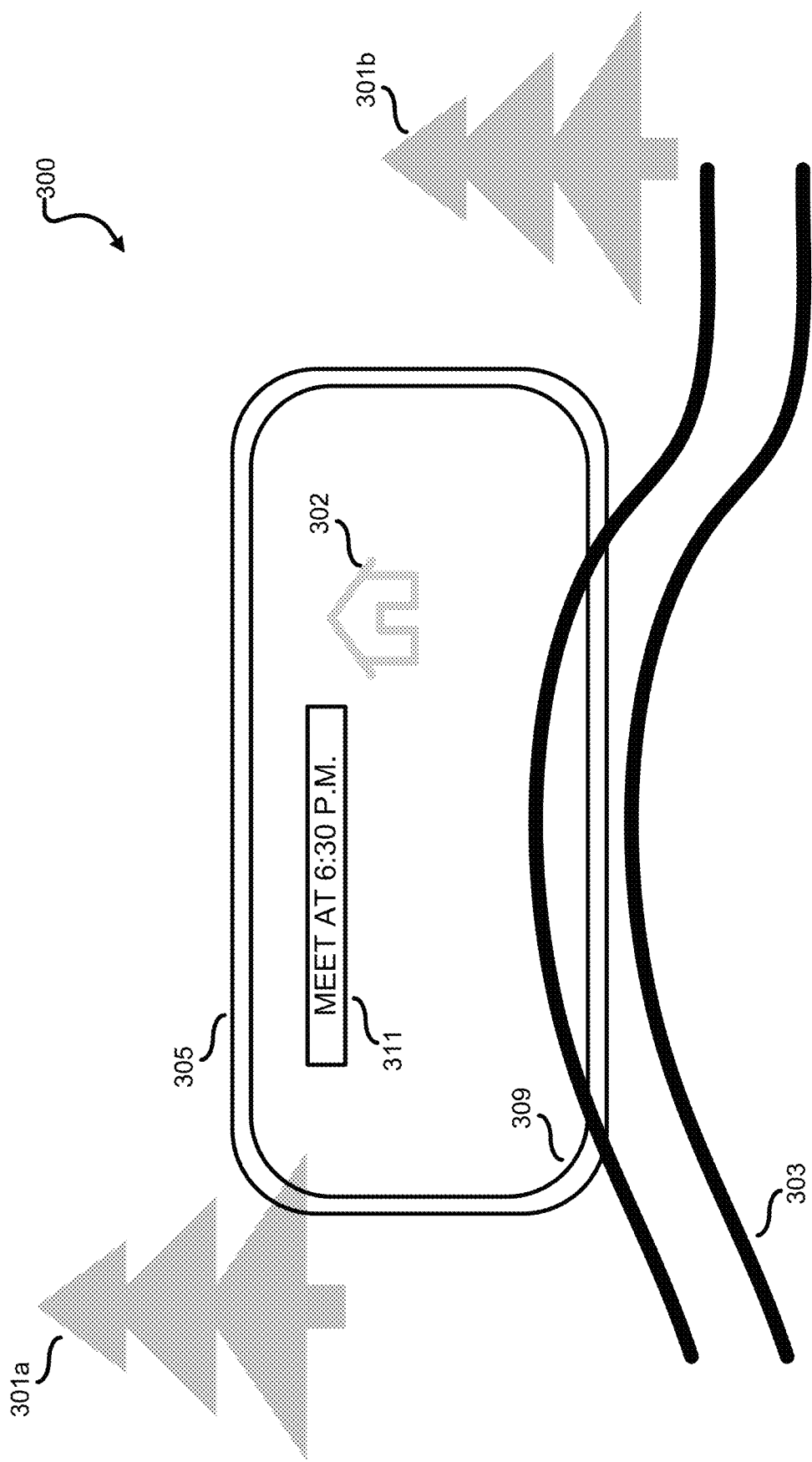
FIG. 3 illustrates an example of a notification appearing in a field of view at an HMD according to certain embodiments of this disclosure.

FIG. 3 illustrates an example of a notification appearing in a field of view at an HMD according to various embodiments of this disclosure. The example field of view in FIG. 3 is for illustration only and other examples could be depicted without departing from the scope of the present disclosure.

Referring to the non-limiting example of FIG. 3, a scene 300 is shown from a viewing point along an internally facing direction relative to an HMD 305. In this illustrative example, scene 300 includes first tree 301a, second tree 301b, house 302 and stream 303.

According to certain embodiments, HMD 305 includes an internally facing display 309. In this non-limiting example, the internally facing display 309 is at least partially transparent, and permits light from first tree 301a and house 302 to pass to the viewing point. According to some embodiments, the internally facing display 309 comprises one or more regions in which items of AR content (for example, notification 311) can be displayed. Depending upon the number (quantity) of applications that are providing content through the internally facing display 309, additional notifications may be presented to the viewer. In the simplified example of FIG. 3, and assuming the user is not driving or engaged in another activity requiring undivided attention, the notification 311 presents a limited distraction to the user, as there is little activity in scene 300 competing with notification 311 for a user's immediate attention.

Figure 4A:
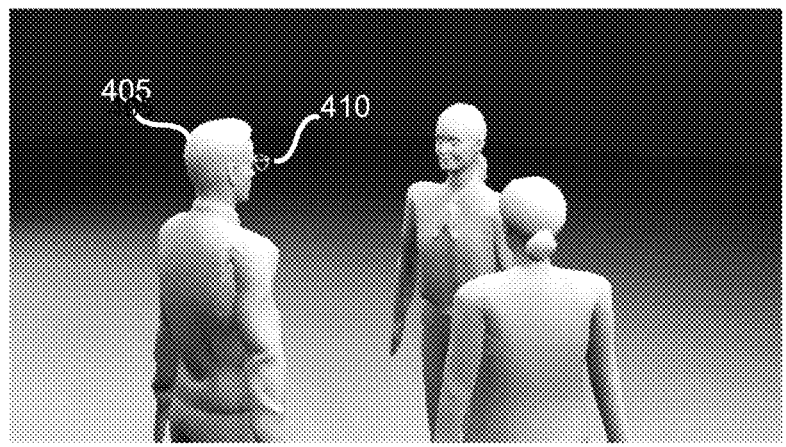
FIGS. 4A and 4B illustrate aspects of a technical problem addressed by certain embodiments according to this disclosure.
Figure 4B:
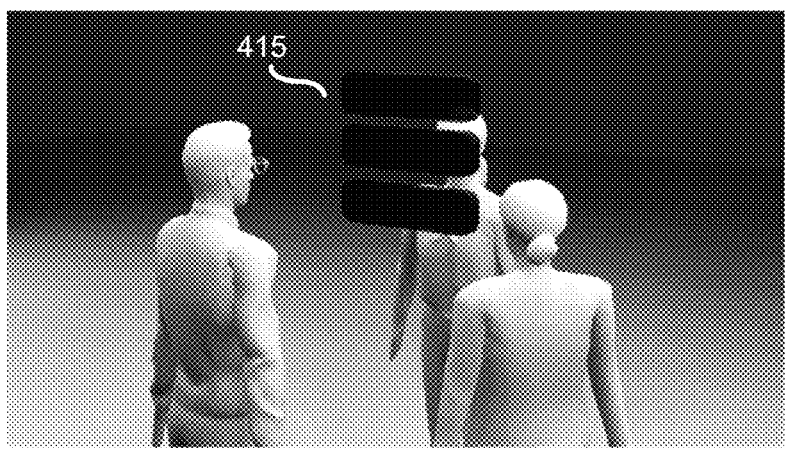

FIGS. 4A and 4B provide an example visualization of one problem specifically addressed by certain embodiments according to this disclosure. Referring to the illustrative example of FIG. 4A, a man and two women are depicted as conducting a real-world conversation. As shown in the example depicted in FIG. 4A, the man 405 is wearing an HMD 410 comprising a pair of smart glasses. As shown in FIG. 4B, the man 405 receives, through his HMD 410, a set of notifications 415 from applications executing on the HMD 410 or an accessory device.

As shown in the visualization of FIG. 4B, given the timing of their appearance, notifications 415 are functionally equivalent to a fourth person loudly interrupting the parties' conversation, immediately drawing the man's attention from the present conversation. Depending upon the context of the notification and the state of the conversation, immediately presenting the notification (for example, if the notification pertained to a clear and present risk to the user's health, such as a public safety announcement for the area) may be appropriate. However, in some contexts, for example, if the notification advised of a multi-day sale at a supermarket, immediately presenting the notification would be inappropriate. A further contextual wrinkle to be considered is the present state of the conversation, and more specifically, the likelihood that the conversation has concluded, or is still ongoing. Returning to the example of an application alerting an HMD-wearer of a sale at a supermarket, if the conversation between the man 405 and the two women had concluded, then it may be appropriate to display an otherwise low-priority notification to the man 405.

As discussed with reference to the examples of FIGS. 5-8, certain embodiments according to the present disclosure solve the technical problem described with reference to FIGS. 4A-4B by deferring display of notifications whose present priority value does not outweigh a value associated with the current conversational state.

FIG. 5 illustrates an example architecture 500 for performing conversation-based notification management according to various embodiments of this disclosure. The architecture descried with reference to FIG. 5 may, in some embodiments, be performed at a single processing platform (for example, HMD 200 in FIG. 2), or at a plurality of processing platforms that includes an HMD providing an AR display that includes notifications from applications.

Referring to the illustrative example of FIG. 5, architecture 500 comprises one or more applications 505 (for example, applications 162 in FIG. 1) executing on a processing platform (for example, the device 100 in FIG. 1 or the HMD 200 in FIG. 2), and which are configured to provide notifications (for example, pop-up notification 311 in FIG. 3, or notifications 401 in FIG. 4B) to a user through an AR display provided at the HMD). As shown in FIG. 5, notifications 510 generated by application(s) 505 are passed to notification manager 550, which implements control logic for conversation-based notification management.

As shown in the explanatory example of FIG. 5, architecture 500 further comprises program code 515 periodically determining a value of the function UserInConversationInstant( ) which returns a value based on one or more factors determined based upon, at a minimum, sensor data from one or more of a microphone or a camera proximate to the HMD, as to the instant probability that the user wearing the HMD is presently in a real-world conversation. In some embodiments, the microphone and camera are components of the HMD. In some embodiments, the microphone and camera may be components of an accessory device (for example, a smartphone or smart watch) that is sufficiently proximate to the HMD that it can provide sensor data that is an effective proxy for data collected at the HMD.

In certain embodiments, in addition to determining an instant value of the probability that the HMD user is presently in a real-world conversation from values based on the instant sensor data, program code 515 may further compute a weighted average of the probability that the HMD user is in a conversation. According to various embodiments, the weighted average may be calculated by assigning a time-based weighting factor (for example, assigning less weight to the oldest determined values of UserInConversationInstant( ) and more weight to the most recent values of UserInConversationInstant( )) of the most recently calculated value of UserInConversationInstant( ) and updating the weighted average value of UserInConversationInstant( ). According to certain embodiments, providing a time-weighted average value of UserInConversationInstant( ) to notification manager 550 can avoid management errors associated with instantaneous pauses in the conversation or misleading camera data (for example, where an HMD wearer turns her head and her conversation partners are no longer in the field of view of the HMD camera).

Referring to the illustrative example of FIG. 5, according to various embodiments, notification manager 550 performs at least the following operations. First, at operation 555, the notification manager determines a current importance weight of the notification(s) 510. As discussed in greater detail herein, the importance of a notification is dynamic, with certain notifications (for example, a notification from a vehicle parking application informing a user that she needs to move her vehicle) becoming more pressing as time passes and others becoming less important as time goes on (for example, a notification from a social media application indicating that a friend engaged with an item of shared content). Additionally, the importance of a notification may further change in response to contextual factors.

As shown in FIG. 5, notification manager 550 further performs operation 560, wherein the notification manager compares a value of the current importance weight of the notification against a current value of a probability that the HMD user is currently in a conversation. In some embodiments, the current value of the probability that the HMD user is currently in a real-world conversation may be the most recently determined value of USERINCONVERSATIONINSTANT( ). In some embodiments, the current value of the probability that the HMD user is currently engaged in a real-world conversation is a time-weighted average of values of USERINCONVERSATIONINSTANT( ) over a specified time window.

Depending upon the outcomes of operations 555 and 560, notification manager 550 can output one of handling instructions 565a through 565d for managing the display of notification(s) 510. According to some embodiments, notification manager 550 can output instruction 565a, which uses the standard logic of the HMD or other processing platform managing the AR display for handling notifications. For example, if notification manager 550 determines that the HMD user is not engaged in a conversation, the processing platform's default policies for handling applies. Similarly, if an overriding factor (for example, an extremely important message, or data showing a user is driving a car or otherwise cannot be distracted), conversation-based notification management is bypassed, and the platform's default notification management logic applies.

According to various embodiments, notification manager 550 can output instruction 565b, wherein notification(s) 510 are displayed to the user. For example, instruction 565b can be issued when the current importance of notification(s) 510 is high relative to the current probability that the HMD user is in a real-world conversation (i.e., where the notification is presently important and/or the probability that the user is in a conversation is low).

As shown in FIG. 5, in some embodiments, notification manager 550 may output instruction 565c, wherein notification(s) 510 are not presently displayed but are instead added to an unseen notification stack maintained in a memory of the HMD. For example, instruction 565b can be issued when the current importance of notification(s) 510 is low relative to the current probability that the HMD user is in a real-world conversation (i.e., where the notification is relatively unimportant and/or the probability that the user is in a conversation is high). Returning to the example of FIGS. 4A and 4B, instruction 565c might be issued when notification 415 pertains to a multi-day sale at a local supermarket, and thus does not require immediate attention.

In certain embodiments, notification manager 550 can output instruction 565d, wherein an unseen notification(s) stack is cleared, and notifications are pulled from a queue of notifications to be displayed. In some embodiments, the unseen notification(s) stack can be cleared in conjunction with another instruction, such as instruction 565b, as displayed notification(s) do not need to be maintained in an unseen notification stack. In certain embodiments, the current importance weight of the notification is periodically recalculated, and the importance of the notification(s) in the unseen notification(s) stack may drop below a threshold value for display. For example, where an application has issued subsequent similar notifications, making the unseen notification(s) duplicative and/or irrelevant.

FIG. 6 illustrates a process 600 for determining an instant value of a variable embodying an instant probability (for example, a calculated value of UserInConversationInstant( )) that a user is in a real-world conversation. While FIG. 6 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 600 depicted can be implemented by one or more processors in mobile electronic device, such as by one or more processors 140 of an electronic device 100 or processor 211 of HMD 200. In certain embodiments, the operations of process 600 may be performed at a single processing platform (i.e., an HMD providing an AR display), or across multiple processing platforms (for example, an HMD connected to another processing platform, such as a smartphone or tablet computer). In certain embodiments, process 600 is performed continuously, at a predetermined intervals (for example, at a first, faster rate if a user has been determined to presently be in conversation, and at a second, slower rate if a user has not been determined to be in conversation recently) whenever the HMD is in use.

At operation 605, the processor determining an instant value of UserInConversationInstant( ) obtains predefined weights for one or more factor modules. As used in this disclosure, the expression factor module encompasses a set of rules or control logic for determining, based on application data and/or sensor data (for example, data obtained from a camera of the HMD or accessory device with a field of view overlapping that of HMD user's field of view, or a microphone of the HMD or accessory device capable of picking up some or all of the same audio as the HMD user's ears) whether the received data satisfies the criteria for a conversation event.

A non-limiting set of example of factor modules according to the present disclosure is provided in Table 1, below:

| Factor Module | Inputs | "In Conversation" Event Triggered By: |
| --- | --- | --- |
| Face in defined region | Sensor data from camera Output of facial recognition algorithm | If a face is within a defined region (for example, an estimated center of the HMD user's field of view, or a location within a specified range of the user) for longer than a threshold time, In Conversation event is triggered. |
| Face recognized | Sensor data from camera Output of facial recognition algorithm | If a face recognized as belong to a database of faces associated with the HMD user is in a defined region for longer than a threshold time, an In Conversation event is triggered. |
| Voice in defined region | Sensor data from one or microphones Output of audio triangulation algorithm | Using one or more of the HMD microphone and the microphone of a connected accessory device, detecting the likely location of audio recognized as a voice. When the tracked voice is within a defined region (for example, within a given proximity, or in front of the HMD user) for at least a threshold time, an In Conversation event is triggered. |
| Recognized voice | Sensor data from one or microphones Output of voice recognition algorithm | Using one or more of the HMD microphone and the microphone of a connected accessory device, detecting the likely location of audio recognized as a previously recognized voice. When the tracked voice is within a defined region (for example, within a given proximity, or in front of the HMD user) for at least a threshold time, an In Conversation event is triggered. |

Further examples of factor modules include a factor module assessing an instant value of a likelihood that a user is in conversation based on a combination of location and/or movement of a device. For example, if location and movement data show that a user is engaged in an activity where conversation is theoretically possible, but less likely (for example, running or cycling at a high rate of exertion), then the output of a location/movement factor may increase or decrement the probability of a user being in conversation to reflect such data. Other possible factor modules include a factor module whose inputs are drawn from a log of user interactions with the HMD. Thus, where an interaction log data shows that a user has recently interacted with one or more applications presented through the HMD, the factor module may return a value indicating that the user's attention is more likely to be focused on digital content than a real-world conversation. Similarly, where an interaction log indicates that a user has not recently interacted with any applications, the factor module may return a value indicating that the user's attention is more likely presently focused on real-world events, rather than AR content provided through the HMD. Although several factor modules are depicted, others could be used without departing from the scope of the present disclosure.

At operation 605, each of the factor modules may be given a predefined weight. According to some embodiments, the assignment of predefined weights may be purely-rule based and responsive to various contextual factors. As one illustrative example, a GPS sensor or WI-FI signal indicates that a user is at home, the weights assigned to predefined weights for detected voices may be decreased, as conversations with familiar voices may be a baseline condition of the environment, and not strongly correlative of an HMD user being a real-world conversation. Alternatively, or additionally, the predefined weights for the one or more factor modules may be dynamic and tuned based on user experience. In some embodiments, an HMD user may provide feedback data as to the contextual appropriateness of notification management, from which the notification manager (for example, notification manager 550 in FIG. 5) may be trained. Further, in certain embodiments, certain factor modules may be selectively activated or deactivated (i.e., given a factor weight of zero) depending upon context. In one example, a calendar application indicates that, for a given time window, a user is going to be at an inherently noisy event (for example, a concert or sporting event at a stadium) the voice-related factor weights may be reduced or set to zero to compensate for the noisiness and abundance of ambient conversation at the event.

According to various embodiments, at operation 610, each factor module (for example, the factor modules described in Table 1 of this disclosure) is run based on the most recently available data as to the HMD user's environment (for example, sensor data from cameras, microphones, and motion and location sensors). In some embodiments, each factor module for which a non-zero weight assigned at operation 605 is run in parallel and independently of each of the other factor modules. In some embodiments, factor modules are run conditionally with one another, such that an "in conversation" event is returned only when the triggering conditions of multiple factor modules are satisfied within a designated interval. For example, certain contexts (for example, when an HMD user is at home) the presence of a recognized face or hearing a known voice, may, by themselves be poorly correlative of whether an HMD user is in a real-world conversation, as, given the nature of shared households, the user is likely to frequently see their family members and hear their voices somewhere in the house. However, the confluence of seeing a person and triangulating their voice to a particular location relative to the HMD user, can, in certain settings, be highly predictive of whether a user is presently engaged in a conversation. Thus, in certain embodiments according to this disclosure, running each factor module at operation 610 comprises running logical combinations (for example, combinations defined by Boolean operators such as AND, OR, NAND, etc.) of one or more factor modules.

Referring to the illustrative example of FIG. 6, at operation 615, a check is performed to determine whether any of the factor modules return a blocking value. For example, in some embodiments, a factor module may return one of the following three values of UserInConversationInstant( ): "0" indicating that no "in conversation" event was detected; "1" indicating that an In Conversation event was detected, and a blocking value "−1" indicating that the factor module detected a condition precluding display of a notification. Non-exhaustive examples of conditions that can trigger a blocking value include sensor data showing a particular individual (for example, the HMD user's spouse, or an individual recognized as a police officer) in a field of view for a threshold portion of time, or detecting a voice whose volume exceeds that of other sounds by a threshold amount (i.e., a factor indicating that someone is likely shouting to get the HMD user's attention). Where one or more factor modules return a blocking value, process 600 proceeds to operation 620, wherein notification(s) are blocked from being displayed as part of the AR display. In this way, certain embodiments according to the present disclosure can implement rules-based notification management policies for clear cases of when a notification is to be blocked (for example, when a voice recognized as an HMD user's teacher is speaking), but also perform a balancing test between the current likelihood of a user is in a real-world conversation against the current importance of the unseen messages for subtler, more nuanced situations.

If no blocking values are returned from running the factor module(s), process 600 proceeds to operation 625, where the results of each (for example, "in conversation" event values) factor module are multiplied by the weighting factors assigned at operation 605 and summed to provide, for a given point in time, an instant value of a function (for example, UserInConversationInstant( )) associated with an instant probability, that based on sensor and application data obtained at a specified time interval, the HMD user is currently in a real-world conversation.

According to various embodiments, at operation 630, weighted results of each factor module are returned to a notification manager (for example, notification manager 550 in FIG. 5). In certain embodiments, a time weighted average of the value of the function associated with the probability that the user is in a real-world conversation is updated and recalculated based on a set of values which includes the most recently obtained value of the function determined at operation 625 is used to determine, and from which the oldest value of the function is removed from the calculation set.

Figure 7:
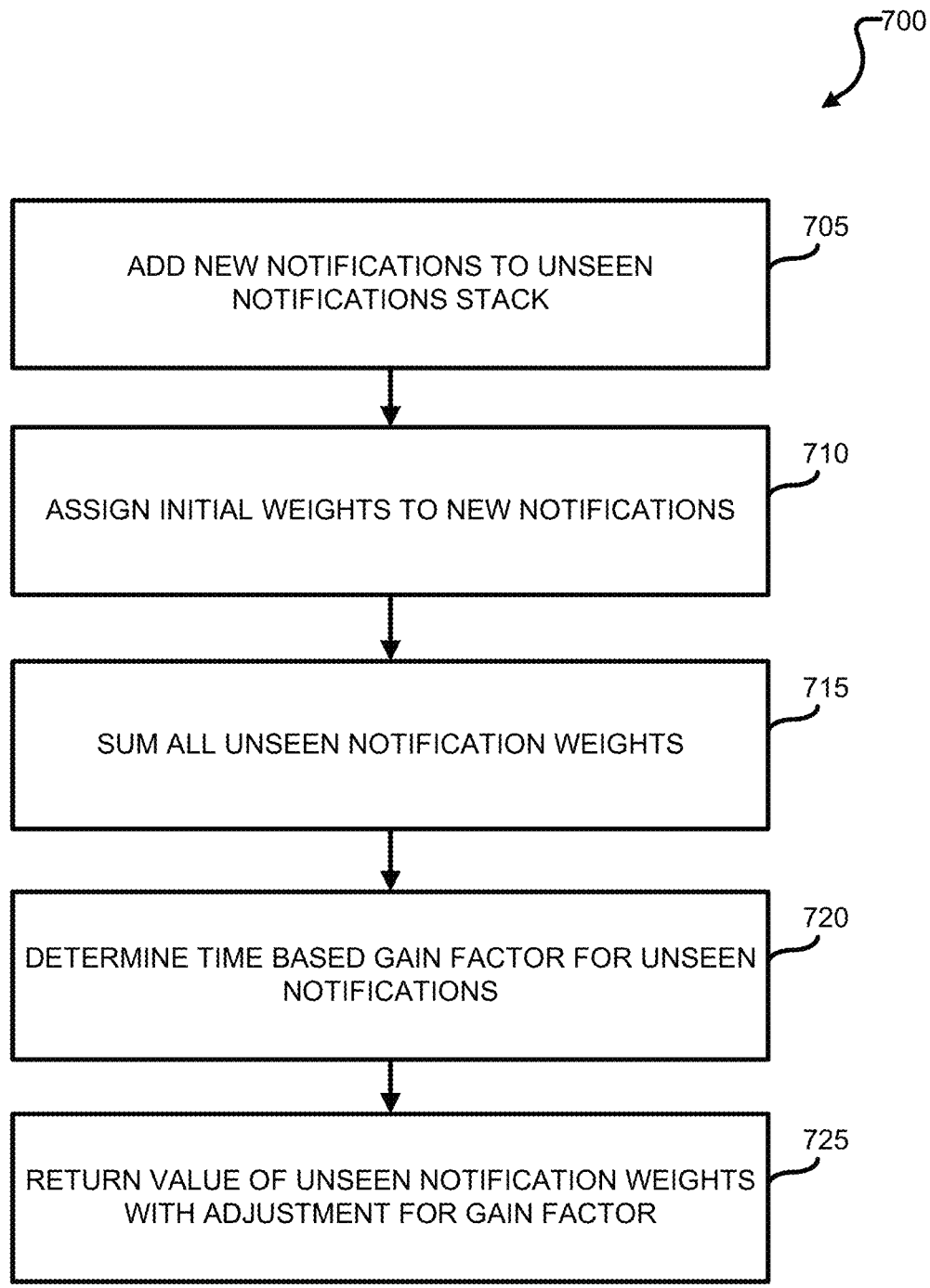
FIG. 7 illustrates a process for determining a current priority of one or more unseen notifications according to certain embodiments of this disclosure.

FIG. 7 illustrates a process 700 for determining current value associated with importance of unseen notification(s) (for example, notifications 510 in FIG. 5) received by a notification manager, according to various embodiments of this disclosure. While FIG. 7 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 700 depicted can be implemented by one or more processors in mobile electronic device, such as by one or more processors 140 of an electronic device 100 or processor 211 of HMD 200. The process 700 can be performed across one or more processing platforms. For example, in some embodiments, process 700 may be performed entirely at an HMD through which an HMD user is viewing an AR display. In various embodiments, process 700 is performed at a processor of an accessory device (for example, a smartphone) connected to and supporting an AR display provided through the HMD.

Referring to the non-limiting example of FIG. 7, at operation 705, a notification manager (for example, notification manager 550 in FIG. 5) according to various embodiments of this disclosure, receives one or more notifications to be displayed in an AR display provided by the HMD. In some embodiments, the notifications are provided by applications running on the HMD or may be notifications provided by the HMD itself (for example, a low battery warning notification). At operation 705, the received notifications are added to an unseen notification(s) stack maintained by the notification manager, pending analysis at operations 710-725 to determine a current notification priority value or whether any factors superseding calculating a current notification priority value are applicable.

As shown in the explanatory example of FIG. 7, at operation 710, the notification manager assigns an initial weight to each notification. According to various embodiments, the initially assigned weights may be static, and set by platform developers. In some embodiments, the initially assigned weights may be user-tunable, with users able to specify aspects of their preferences for how long presentation of notifications is deferred. In some embodiments, the assigned weights may be initially set by platform developers but modified through learned adjustments based on training data from user interactions with the HMD. Additionally, in some embodiments, at operation 710, the notification manager analyzes the received notifications to determine whether the notifications belong to a type designated as superseding calculation (i.e., notifications that should be presented to a user, regardless of whether they are in a conversation). Non-limiting examples of notifications superseding a calculation include notifications regarding calls or texts from predefined users (for example, an HMD user's mother) or safety related notifications (for example, a flash flood warning from a weather application). Where a notification belongs to a type designated as superseding calculation, it is displayed, and removed from the unseen notification stack, and the remaining notifications in the unseen notification stack are passed to operation 715.

In certain embodiments, the determination of initial weights at operation 710 is based on a further analysis of simply the type of each received notification in the unseen notification stack. For example, in some embodiments, the notification weights assigned at operation 710 may be based on patterns in the unseen notification stack (for example, where two calls from the same number are received, the total priority weight for the calls may be higher than if the calls were received separately). As another non-limiting example, where one notification supersedes another notification (for example, where a restaurant application provides a first notification advising the HMD user of a 15-minute wait time, and a second notification advising the user that their table is ready). In this example, the second notification advising that the HMD user's table is ready moots the first notification advising of a 15-minute wait for a table.

At operation 715, a sum of the unseen notification weights in the unseen notifications is determined. According to various embodiments, where unseen notifications accumulate in the unseen notification stack, the baseline expectation is that the priority of the notifications increases. Put differently, while certain embodiments according to this disclosure may apply a gain factor or other adjustment to account for the effects of time on the relative priority of the unseen notifications, the pre-gain adjustment expectation is that, the more unseen notifications, the greater the priority that a user look at their unseen messages.

As noted previously, certain embodiments according to this disclosure account for the fact that the real priority of notifications is dynamic, with certain types of notification having a priority that increases over time, and other types of notification having a decaying priority. To reflect this fact, at operation 720, one or more gain functions are applied to the summed weights of the unseen notifications obtained at operation 715. According to various embodiments, a single time-based gain factor may be added to the sum of the unseen notification weights, such that the priority of the unseen notifications increases linearly with time. According to various embodiments, a multi-variable gain factor may be applied. For example, the notifications in the unseen notifications stack may be divided into notifications whose priority increases with time and notifications whose priority decreases with time, and positive gain values (for the applications with increasing priority) and negative gain values (for applications with decreasing priority) are determined and summed to determine an overall time-based gain factor. In this way, an HMD user's real-world conversations may be less likely to be interrupted with unwanted notifications, when the unseen notification stack fills up with low-priority notifications.

As shown in FIG. 7, at operation 720, the time-based gain factor is applied to the summed weights of the unseen notifications in the unseen notifications stack to determine a current value of the importance of the unseen notifications currently in the unseen notification stack. The current value of the importance of the unseen notifications currently in the unseen notification stack is returned to the notification manager to be compared against a present value of the likelihood (based on an instant value or time weighted average value of a function associated with the probability of a user being in a real-world conversation) that the HMD user is currently engaged in a real-world conversation.

Table 2, below, provides an illustrative example of notification management according to various embodiments of this disclosure over a series of points in time. In the example of Table 2, the variable "UC" refers to the current moving average of a variable (for example, UserInConversationInstant( )) associated with the probability that an HMD user is in a real-world conversation. In this example, the variable "NRW" is a quantification of the relative weights of the notifications in an unseen notification stack.

TABLE 2

| Time | Action | UC | NRW | Comments |
|---|---|---|---|---|
| 1 | Notification received by notification manager, while the HMD user is not presently in conversation. | 0 | 1 | Notification displayed, as user is not in conversation |
| 2 | User begins real-world conversation | 0 | 0 | |
| 3 | Using camera and microphone data, system recognizes a face and a voice | 4 | 0 | |
| 4 | User receives two social media notifications. | 4 | 2 | Social media notifications are not displayed because UC > NRW |
| 5 | Conversation continues. | 4 | 2.1 | NRW increases according to a gain function adding 0.1 to NRW for each minute a notification goes unseen. |
| 6 | Conversation continues for 20 minutes. | 4 | 4.1 | Notifications shown to user, because NRW > UC at this time. |
| 7 | Conversation continues. | 4 | 0 | Unseen notifications stack is cleared as notifications were displayed to user. |
| 8 | User begins to walk away, sensors detect conversation partner's voice, but face is no longer detected in camera data. | 2 | 0 | |

TABLE 2-continued

| Time | Action | UC | NRW | Comments |
|------|--------|-----|-----|----------|
| 9 | User walking away, conversation partner's voice no longer audible, face no longer visible. | 1.5 | 0 | Moving average of UC begins moving to zero as factor modules no longer return In Conversation events. |

Figure 8:
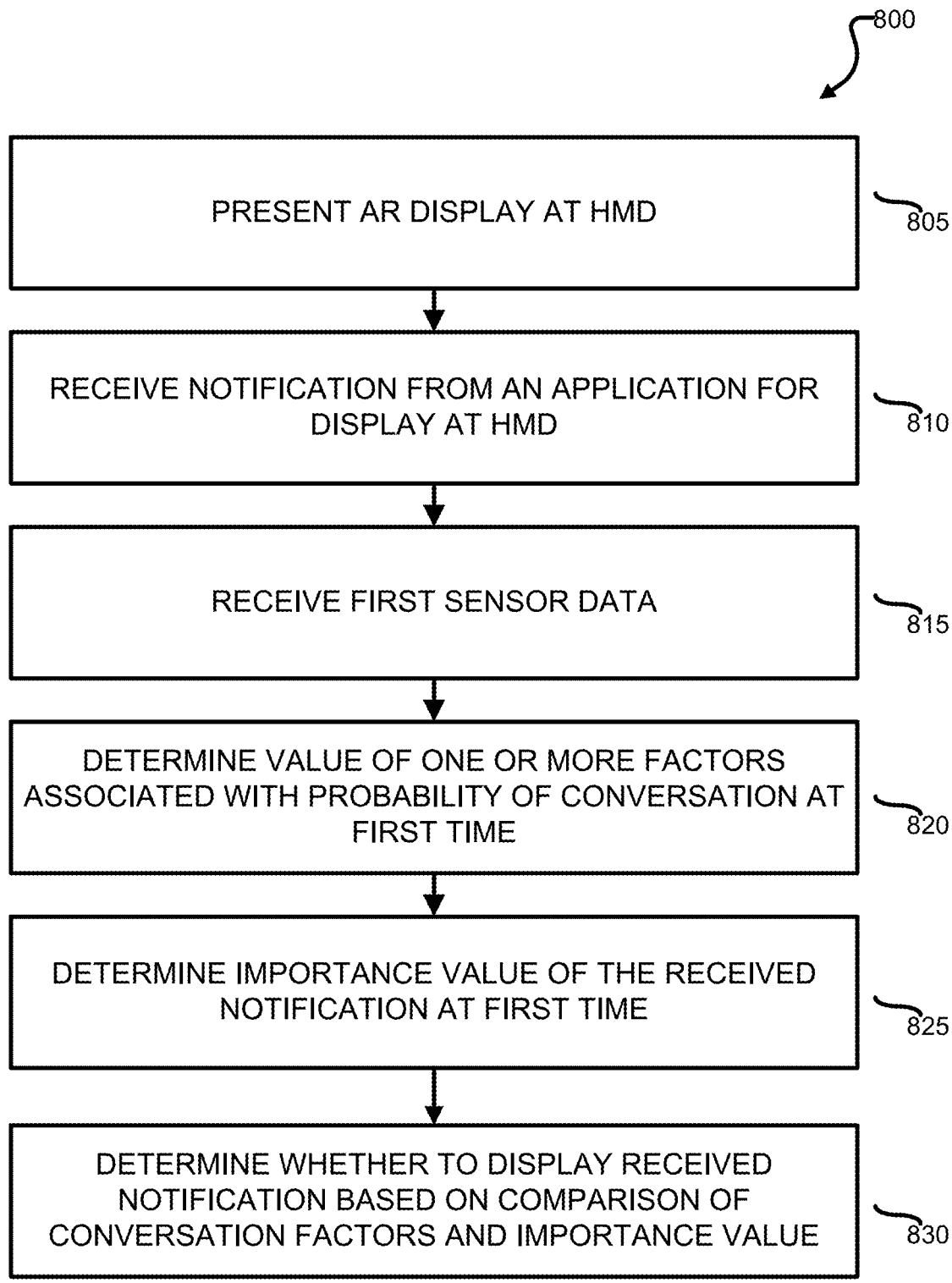
FIG. 8 illustrates a process for performing conversation-based notification management according to certain embodiments of this disclosure.

FIG. 8 illustrates a process 800 for performing conversation-based notifications according to various embodiments of this disclosure. While FIG. 8 depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process 800 depicted can be implemented by one or more processors in mobile electronic device, such as by one or more processors 140 of an electronic device 100 or processor 211 of HMD 200. The operations of process 800 may, in embodiments, be performed at a single computing platform (for example, HMD 200 in FIG. 2). Alternatively, or additionally, the operations of process 800 may be performed in whole, or in part, at a processing platform communicatively connected to the HMD. For example, in some cases, it may be desirable from a battery life and heat management perspective, to minimize, wherever possible, the amount of processing performed at the HMD. Accordingly, in such embodiments, notification management may be offloaded to an accessory device, such as a smartphone or smart watch communicatively connected to the HMD.

Referring to the illustrative example of FIG. 8, one or more applications providing an AR display at the HMD is executing and providing an AR display to a viewer. The AR display comprises elements of a real-world view from the perspective of the HMD user (for example, what the user sees through a clear screen of the HMD) and can also comprise elements of digital content provided in conjunction with the real-world view.

According to various embodiments, at operation 810, a notification manager (for example, notification manager 550 in FIG. 5) executing at the HMD or an accessory device, receives a notification from an application or a processing platform (for example, a system notification, such as a low battery warning or a system update reminder) to be presented through the HMD. In certain embodiments, the received notification is added to an unseen notification(s) stack, pending determination of factors associated with a likelihood that a user is presently in a real-world conversation and determination of the current priority of the unseen notifications in the unseen notification(s) stack.

As shown in the illustrative example of FIG. 8, at operation 810, the system receives first sensor data obtained at a first time. According to various embodiments, the first sensor data is obtained from one or more of a camera or a microphone located on the HMD, or an accessory device at another location (for example, a smartphone in a user's shirt pocket) providing a useful proxy for the sounds and sights obtained at perspective of the user's eyes and ears. According to various embodiments, application and system data, for example, data showing the location or movement of the HMD user, may also be obtained at operation 815.

According to various embodiments, at operation 820, the sensor data obtained at operation 815 is provided to one or more factor modules (for example, one or more of the factor modules described in Table 1 of this disclosure), to obtain values of one or more factors associated with the probability of the user being in a real-world conversation. In some embodiments, at operation 820, a weighting factor may be applied to the values output by each of the factor modules. When the obtained sensor data is provided to more than one factor module, a sum of the weighted outputs of the factor modules may be calculated. Additionally, in certain embodiments, at operation 820, the system may perform a determination (for example, as shown in operation 615 in FIG. 6) to see if any factor modules return a blocking value, superseding the need for further analysis of conversation factors. According to some embodiments, at operation 820, the system determines a current value of a moving average of the value of the probability that the user is presently in a real-world conversation.

As shown in the explanatory example of FIG. 8, at operation 825, the system or a component thereof (for example, notification manager 550 in FIG. 5) determines an importance value of the notifications currently in the unseen notification(s) stack. According to various embodiments, determining the importance of the received notification(s) comprises assigning predefined weights to each notification, taking a sum of the predefined weights and then applying a time-based gain factor to the sum of the predefined weights.

According to various embodiments, at operation 830, the notification manager performs a comparison of the current value of the probability of the HMD user being in a real-world conversation at the first time against the current importance value of the unseen notification(s). Where the current importance value of the unseen notification(s) exceeds that of the current value of the probability of the HMD user being in a real-world conversation, the notifications are displayed through the HMD, and the unseen notification(s) stack is cleared. Similarly, where the current importance value of the unseen notification(s) is less than that of the current value of the probability of the HMD user being in a real-world conversation, the notification(s) are kept in the unseen notification(s) stack, and the relative values may be recalculated based on sensor data obtained at a second time.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for dynamic notification management at a head mounted display (HMD), comprising:
   presenting, at the HMD, an augmented reality (AR) display comprising items of digital content incorporated into a field of view of the HMD;
   receiving, at a processor controlling the HMD, a notification from an application for display at the HMD;
   receiving, at the processor at a first time, first sensor data from one or more of a camera or a microphone, the one or more of the camera or the microphone being located proximate to the HMD;
   determining, based on the first sensor data, a first value of one or more factors associated with a probability that a user of the HMD is currently in a real-world conversation;
   determining an importance value of the received notification at the first time; and
   determining whether to display the notification from the application based on a comparison of the first value of the one or more factors associated with the probability that the user is currently in the real-world conversation relative to the importance value of the received notification at the first time.

2. The method of claim 1, further comprising:
   receiving, at the processor at a second time, second sensor data from at least one of the camera or the microphone;
   determining, based on the second sensor data, a second value of the one or more factors associated with the probability that the user of the HMD is currently in the real-world conversation;
   determining, based at least in part on the first value and the second value of the one or more factors, a current moving average of the one or more factors associated with the probability of the user being in the real-world conversation;
   determining the importance value of the received notification at the second time; and
   determining whether to display the notification from the application based on a comparison of the current moving average of the one or more factors associated with the probability of the user being in the real-world conversation relative to the importance value of the received notification at the second time.

3. The method of claim 2, further comprising:
   responsive to determining that the current moving average of the one or more factors associated with the probability of the user being in the real-world conversation exceeds the importance value of the received notification at the second time, postponing displaying the received notification; or
   responsive to determining that the current moving average of the one or more factors is less than the importance value of the received notification at the second time, displaying the received notification in the AR display.

4. The method of claim 1, wherein the one or more factors associated with the probability the user is currently in the real-world conversation comprise one or more of: detection of a face within a field of view of the camera, detection of a recognized face in the field of view of the camera, detection of a voice by the microphone, or detection of a recognized voice by the microphone.

5. The method of claim 4, further comprising:
   detecting the face within the field of view of the camera;
   determining, based on detecting the face, that the first value of the one or more factors associated with the probability that the user is currently in the real-world conversation is greater than the importance value of the received notification at the first time; and
   responsive to determining that the probability that the user is currently in the real-world conversation is greater than the importance value of the received notification at the first time, adding the face to a recognized faces database of the HMD.

6. The method of claim 1, wherein the importance value of the received notification at the first time is based on one or more of a type of the application providing the notification, an identity of a person associated with the notification, or an undelivered time for the received notification.

7. The method of claim 1, further comprising:
   responsive to determining that the first value of the one or more factors associated with the probability that the user is currently in the real-world conversation exceeds the importance value of the received notification at the first time, postponing displaying the received notification; or
   responsive to determining that the first value of the one or more factors associated with the probability that the user is currently in the real-world conversation is less than the importance value of the received notification at the first time, displaying the received notification in the AR display.

8. The method of claim 1, further comprising:
   determining, by the processor, that a contextual factor is satisfied at the first time; and
   responsive to determining that the contextual factor is satisfied, suspending display of all notifications in the AR display.

9. The method of claim 8, wherein the contextual factor comprises one or more of a determination that the user is driving or walking, a determination that the HMD is low on power, a determination that many faces are detected, a determination that the user is in a predetermined location, a determination that a predetermined application is running, or a determination that the first time falls within a predetermined time range.

10. The method of claim 1, wherein the first sensor data comprises audio data from the microphone or a triangulated location of a source of the audio data.

11. An apparatus for performing dynamic notification management comprising:
    a processor communicatively connected to a head mounted display (HMD); and
    a memory containing instructions that, when executed by the processor, cause the apparatus to:
      present, at the HMD, an augmented reality (AR) display comprising items of digital content incorporated into a field of view of the HMD,
      receive a notification from an application for display at the HMD,
      receive, at a first time, first sensor data from one or more of a camera or a microphone, the one or more of the camera or the microphone being located proximate to the HMD,
      determine, based on the first sensor data, a first value of one or more factors associated with a probability that a user of the HMD is currently in a real-world conversation,
      determine an importance value of the received notification at the first time, and
      determine whether to display the notification from the application based on a comparison of the first value of the one or more factors associated with the probability that the user is currently in the real-world conversation relative to the importance value of the received notification at the first time.

12. The apparatus of claim 11, wherein the memory further contains instructions that, when executed by the processor, cause the apparatus to:
receive, at a second time, second sensor data from at least one of the camera or the microphone,
determine, based on the second sensor data, a second value of the one or more factors associated with the probability that the user of the HMD is currently in the real-world conversation,
determine, based at least in part on the first value and the second value of the one or more factors, a current moving average of the one or more factors associated with the probability of the user being in the real-world conversation,
determine the importance value of the received notification at the second time, and
determine whether to display the notification from the application based on a comparison of the current moving average of the one or more factors associated with the probability of the user being in the real-world conversation relative to the importance value of the received notification at the second time.

13. The apparatus of claim 12, wherein the memory further contains instructions that, when executed by the processor, cause the apparatus to:
responsive to determining that the current moving average of the one or more factors associated with the probability of the user being in the real-world conversation exceeds the importance value of the received notification at the second time, postpone displaying the received notification, or
responsive to determining that the current moving average of the one or more factors is less than the importance value of the received notification at the second time, display the received notification in the AR display.

14. The apparatus of claim 11, wherein the one or more factors associated with the probability the user is currently in the real-world conversation comprise one or more of: detection of a face within a field of view of the camera, detection of a recognized face in the field of view of the camera, detection of a voice by the microphone, or detection of a recognized voice by the microphone.

15. The apparatus of claim 14, wherein the memory further contains instructions that, when executed by the processor, cause the apparatus to:
detect the face within the field of view of the camera,
determine, based on detecting the face, that the first value of the one or more factors associated with the probability that the user is currently in the real-world conversation is greater than the importance value of the received notification at the first time, and
responsive to determining that the probability that the user is currently in the real-world conversation is greater than the importance value of the received notification at the first time, add the face to a recognized faces database of the HMD.

16. The apparatus of claim 11, wherein the importance value of the received notification at the first time is based on one or more of a type of the application providing the notification, an identity of a person associated with the notification, or an undelivered time for the received notification.

17. The apparatus of claim 11, wherein the memory further contains instructions that, when executed by the processor, cause the apparatus to:
responsive to determining that the first value of the one or more factors associated with the probability that the user is currently in the real-world conversation exceeds the importance value of the received notification at the first time, postpone displaying the received notification, or
responsive to determining that the first value of the one or more factors associated with the probability that the user is currently in the real-world conversation is less than the importance value of the received notification at the first time, display the received notification in the AR display.

18. The apparatus of claim 11, wherein the memory further contains instructions that, when executed by the processor, cause the apparatus to:
determine that a contextual factor is satisfied at the first time, and
responsive to determining that the contextual factor is satisfied, suspend display of all notifications in the AR display.

19. The apparatus of claim 18, wherein the contextual factor comprises one or more of a determination that the user is driving or walking, a determination that the HMD is low on power, a determination that many faces are detected, a determination that the user is in a predetermined location, a determination that a predetermined application is running, or a determination that the first time falls within a predetermined time range.

20. The apparatus of claim 11, wherein the first sensor data comprises audio data from the microphone or a triangulated location of a source of the audio data.

* * * * *